United States Patent [19]
Schieber

[11] Patent Number: 5,615,763
[45] Date of Patent: Apr. 1, 1997

[54] VIBRATORY CONVEYOR SYSTEM FOR ADJUSTING THE PERIODIC RESULTANT FORCES SUPPLIED TO A CONVEYOR TROUGH

[75] Inventor: Douglas A. Schieber, PeWee Valley, Ky.

[73] Assignee: Carrier Vibrating Equipment, Inc., Louisville, Ky.

[21] Appl. No.: 516,526

[22] Filed: Aug. 18, 1995

[51] Int. Cl.⁶ .................................................. B65G 25/00
[52] U.S. Cl. ................................................ 198/751; 198/770
[58] Field of Search ..................................... 198/751, 770

[56] References Cited

U.S. PATENT DOCUMENTS

| | | | |
|---|---|---|---|
| 4,255,254 | 3/1981 | Faust et al. | 198/770 X |
| 5,064,053 | 11/1991 | Baker . | |
| 5,131,525 | 7/1992 | Musschoot | 198/770 |
| 5,392,898 | 2/1995 | Burgess et al. | 198/751 X |
| 5,404,996 | 4/1995 | Durnil . | |

FOREIGN PATENT DOCUMENTS 403120109  5/1991  Japan ..................... 198/751

*Primary Examiner*—D. Glenn Dayoan
*Attorney, Agent, or Firm*—Wheat, Camoriano, Smith & Beres, PLC

[57] ABSTRACT

A vibratory system for changing or maintaining a resultant vibratory force supplied to a spring support conveyor trough has a pair of spaced, parallel shafts and phase elements for supplying a resultant to force to the trough. A sensing device generates a signal corresponding to the real time phase angle between the phase elements. This signal is compared to a signal corresponding to the desired phase angle and the real time phase angle is essentially the same as the desired phase angle thereby providing the desired resultant force to the conveyor.

8 Claims, 4 Drawing Sheets

5,615,763

VIBRATORY CONVEYOR SYSTEM FOR ADJUSTING THE PERIODIC RESULTANT FORCES SUPPLIED TO A CONVEYOR TROUGH

BACKGROUND OF THE INVENTION

This invention is related to a control system for vibratory conveyors and, more particularly, to a control system for vibratory conveyors in which the force providing the vibratory motion to the trough conveying the material is controlled.

There are various systems for controlling the direction and/or speed of material being carried by a vibratory conveyor. The systems typically operate to change either the direction or the magnitude of a force applied to a trough mounted for vibratory motion, usually provided by a plurality of springs, on a support. For purposes of this description, change, alteration, varying or adjustment of a force means changing the magnitude of the force, the direction along which the force acts, or both.

An example of a system for changing the force direction utilizes a plurality of rotating shafts and associated eccentric weights to supply a cyclical force to the vibratory trough. This system uses a mechanism for adjusting the relative positioning of one or more of the rotating shafts carrying the eccentric weights which in turn varies the direction of the maximum throw to the trough of the conveyor. Such a eccentric weight system is described in detail in U.S. Pat. No. 5,064,053 in which a single rotating shaft bearing an eccentric weight is in a parallel relationship with and positioned between paired additional rotating shafts bearing eccentric weights. The centered single shaft rotates in one direction while the paired shafts rotate in the opposite direction but at the same number revolutions per minute. In any 360° rotation of the shafts, all eccentric weights will be oriented so that the centrifugal forces, due to rotation of the eccentric weights, will be in the same direction, i.e., at the same angle with respect to the horizontal plane twice in the rotation. This provides a maximum resultant force, the aggregate centrifugal force, each time in that direction. Similarly, a minimum resultant force will be experienced twice in a 360° rotation. By varying the orientation of the single shaft with respect to the paired shafts, the "phase angle" relationship between the single rotating shaft and the paired rotating shafts, can be changed, thus changing the direction or "angle of attack" of the maximum resultant force supplied to the trough. In the system of the '053 patent, all shafts are driven by a single motor and a belt and pulley (sheave) system. A mechanism is supplied that changes the orientation of the central shaft with respect to the paired shafts, thus changing the phase relationship. The adjustment of the central shaft can be accomplished even when the system is operating to vary the direction of the maximum resultant force supplied to the trough.

Still another example of a vibrating conveyor system having the capability of adjusting the resultant force is found in the description of U.S. Pat. No. 5,404,996. As described, this system has a pair of spaced and parallel rotating shafts each provided with crankshafts linked together by a plurality of arms pivotally connected to the underside of a trough. The shafts are rotatably driven by a single motor through a series of belts and pulleys. The trough is mounted on tuned springs attached to a base. The apparatus set forth in Patent '996 provided a significant advantage over other single eccentric crank shaft vibrating conveyors since the peak-to-peak displacement, i.e., maximum amplitude or displacement can be varied effectively between zero and a maximum. This is accomplished by a structure that permits the phase angle relationship between the rotating crankshafts to be mechanically adjusted thereby changing the amplitude of the displacement supplied to the trough.

None of the systems of the prior art, however, provide for the continuous and automatic adjustment of the phase angle relationship between shafts while in operation. Most require a mechanical structure consisting of pulleys, pivoting blocks mounting certain of the pulleys, and other mechanical devices to change the phase angle relationship between the "phase elements" associated with the rotating shafts, e.g., eccentric weights or crankshafts. Such structure occupies considerable space, often a significant operating detriment when the available manufacturing floor space for conveying equipment is limited. Moreover, continuous monitoring and adjustment of such systems during operation may be required to ensure that the proper angle phase relationship is maintained. It is therefore a paramount object of the present invention to provide for a system for adjusting the phase angle relationship between phase elements therein without the need for a complicated mechanical structure. It is still another important object of the present invention to provide for a system that continuously maintains a predetermined phase angle relationship during operation thereof. It is still a further object of the present invention to provide for a system for altering the phase relationships compatible with available limited manufacturing floor space.

SUMMARY OF THE INVENTION

A vibrating conveying system for changing or maintaining a resultant vibratory force supplied to a conveyor trough meeting the above objectives has a support base that is connected to a conveyor trough by a plurality of springs. The mechanism for supplying the force necessary to vibrate the trough includes at least a pair of spaced, parallel shafts upon which phase elements are mounted. Each of the shafts are independently rotated and are operatively connected to the trough. The rotation of the shafts and the phase elements supply a resultant force to the trough, thus causing the trough to vibrate. The force can be changed by varying the phase angle relationship existing between the phase elements. The variation in phase angle relationship is accomplished using sensing elements, associated with each of the shafts, for generating signals when locating reference points on the rotating shafts. The signals are communicated to a controller that generate a signal corresponding to the real time relative phase angle difference between the two shafts. This signal is then compared to a signal received from a user station that corresponds to a predetermined phase angle that would produce a desired resultant force acting on the conveyor trough. The controller then provides a signal to a motor speed control device that, in response to this signal, adjusts the speed of one of the shafts until the real time phase signal is essentially the same as the predetermined phase angle signal, thereby providing the desired resultant force to the conveyor trough. Thus, the system in accordance with the present invention continuously maintains the device operating with the predetermined phase angle relationship or can easily be changed by changing the input signal to the controller.

Other objects of the present invention will become readily apparent to those skilled in the art from the following description and appended drawing wherein there is shown and described a preferred embodiment of the present invention. As it will be realized, the invention is capable of other and different embodiments, and its several details are capable of modifications in various, obvious aspects, all without departing from the invention. Accordingly, the drawing and descriptions will be regarded as illustrative in nature and not as restrictive.

DETAILED DESCRIPTION OF THE DRAWING

DETAILED DESCRIPTION OF THE PREFERRED EMBODIMENT

Figure 1:
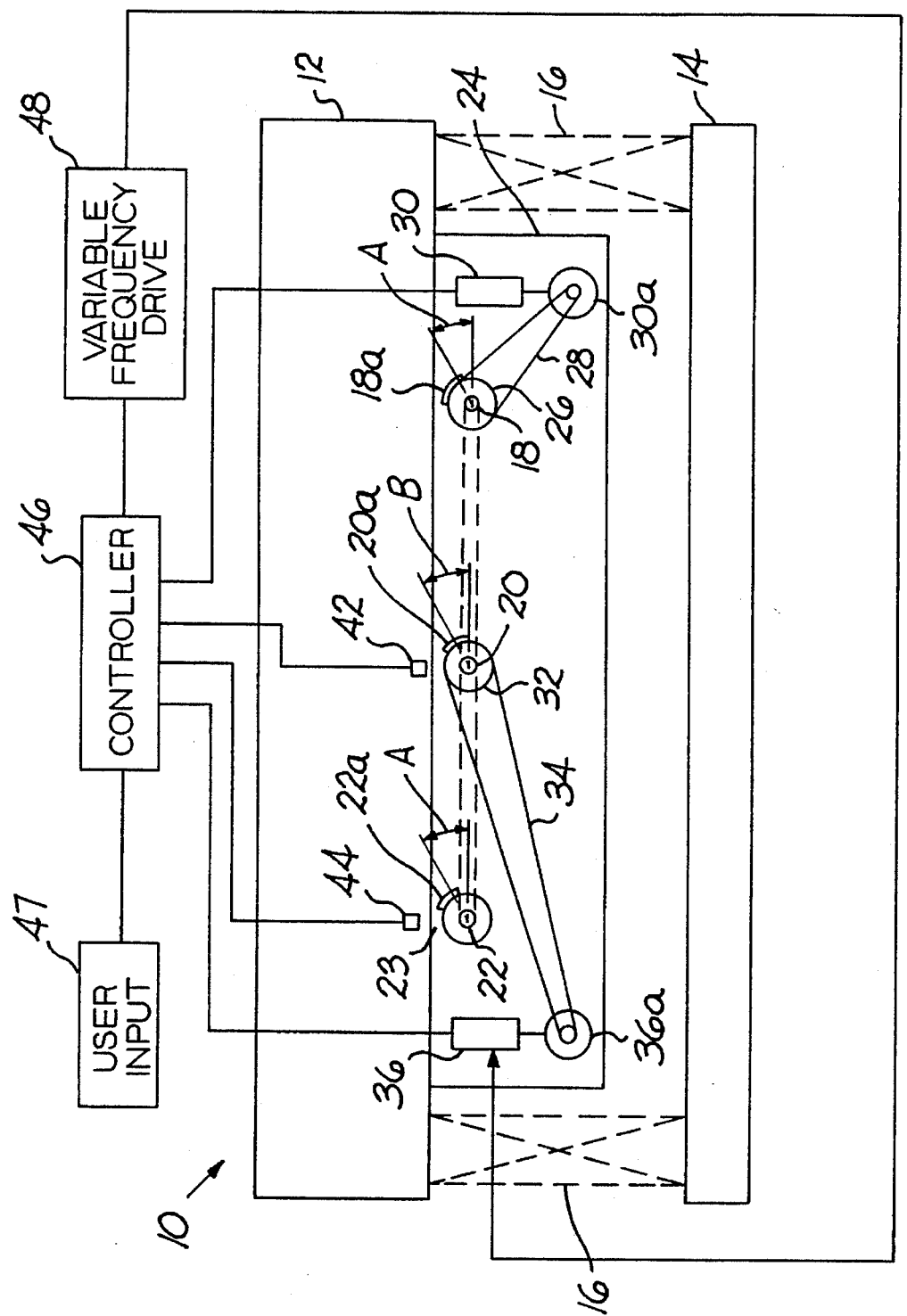
FIG. 1 is a schematic of an embodiment of the present invention showing a side view of a vibratory conveyor apparatus having eccentric weights mounted on rotating shafts to impart a vibratory motion to the conveying trough.
Figure 2:
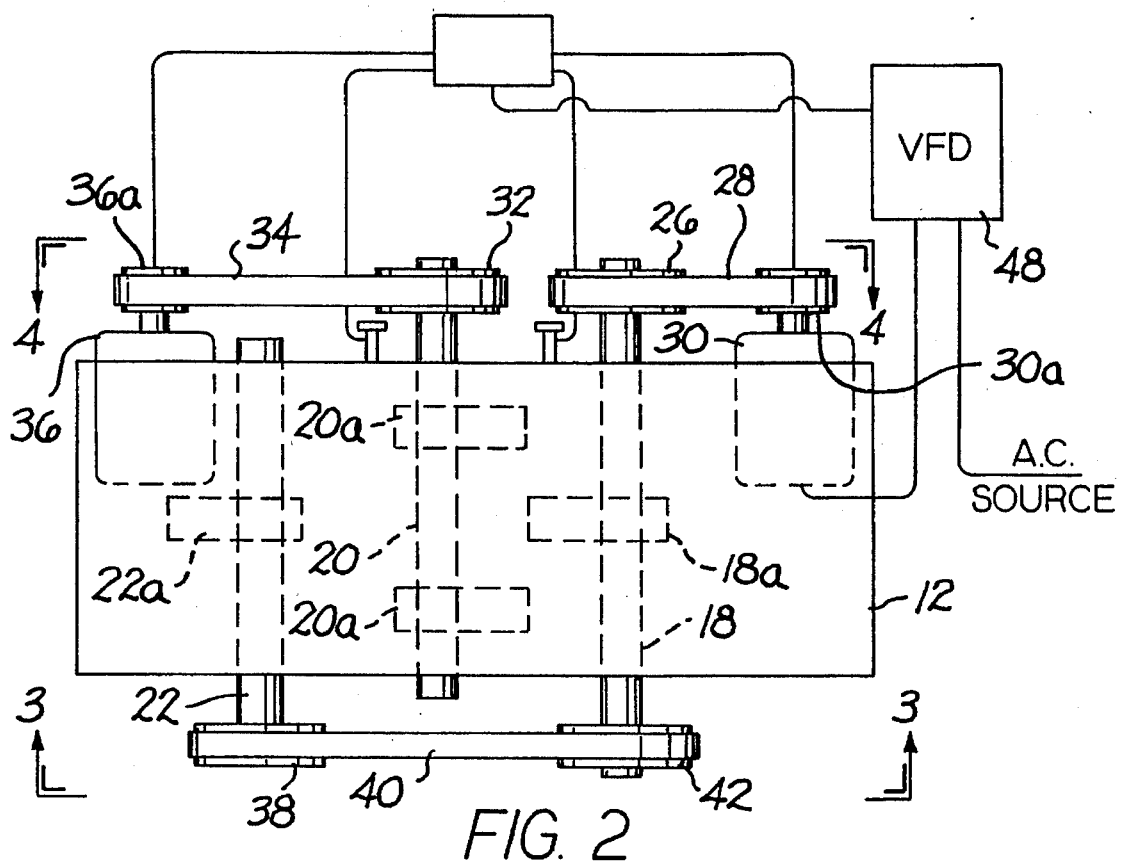
FIG. 2 is a top view of the vibratory apparatus of the present invention showing the respective location of the eccentric weights and shaft driving elements.
Figure 3:
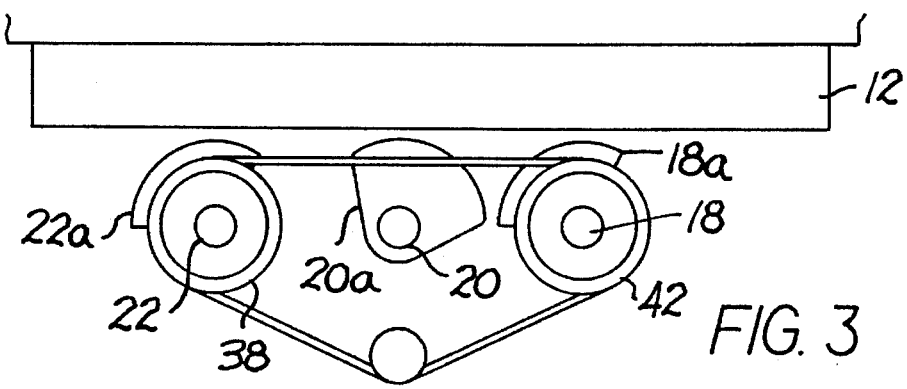
FIG. 3 is a sectional view of the apparatus illustrated in FIG. 2 along lines 3—3.
Figure 4:
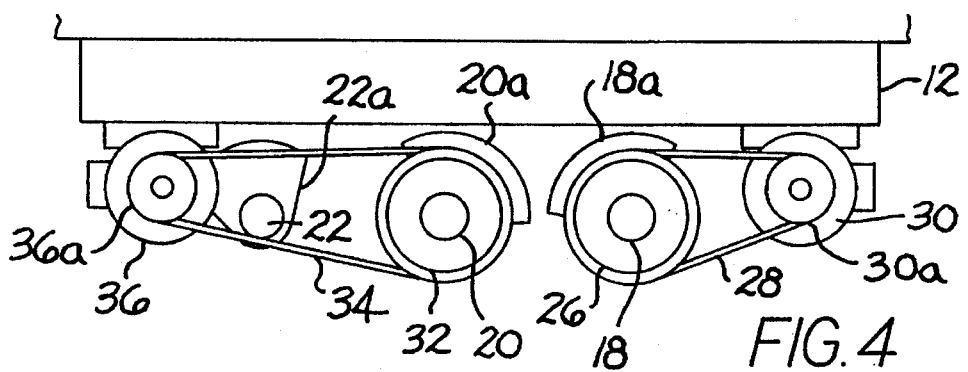
FIG. 4 is a sectional view of the apparatus illustrated in FIG. 2 taken along lines 4—4.

Reference is now made to FIGS. 1 through 4 in which the conveyor system is generally noted by the character numeral 10. A vibratory trough 12 is mounted to but isolated from a stationary base 14 by a plurality of isolating springs 16. Three shafts 18, 20 and 22 are mounted for rotational movement within a frame 24, preferably secured to the under carriage of trough 12. Shaft 18 is provided with a pulley 26 that is driven by belt 28 leading from pulley 30a of a motor 30. Similarly shaft 20 is provided with a pulley 32 that is driven by belt 34 from a pulley 36a of a motor 36. Motors 30 and 36 are also preferably secured to frame 24. As best seen in FIG. 2, one end of shaft 22 mounts a pulley 38 connected by belt 40 to a pulley 42 secured to the opposite end of shaft 18. Thus, motor 30 drives both shafts 18 and 22.

Shafts 18 and 22, respectively, have eccentrically mounted weights 18a and 22a positioned intermediate the ends thereof. Preferably the weights 18a and 22a have the same mass and angular orientation with respect to their respective associated shafts. Similarly, shaft 20 has a pair of spaced apart, eccentrically mounted weights 20a intermediate the ends thereof. Shafts 18 and 22 rotate in the opposite direction to shaft 20. Preferably the total mass of weights 20a are approximately twice those of the individual masses of weights 18a and 22a. The theory of operation of an eccentric weight vibratory conveyor having the capability to alter the speed and direction of the material carried by the conveyor is explicitly described in the aforementioned U.S. Pat. No. 5,064,053, incorporated by way of reference herein. Briefly, however, and as described above, such conveyor system operates upon the principal of altering the direction of the maximum resultant force acting on the conveyor due to the centrifugal forces imparted by the rotating eccentric weights. The magnitude of the resultant force acting on the conveyor goes between a maximum and minimum in a sinusoidal manner. The direction of the maximum resultant force is dependent upon the relative phase angle between the position of the rotating weights. As best seen in FIG. 1, shafts 18 and 22 with respective weights 18a and 22a will have an angle A measured between an outwardly directed radial line from the center of the respective rotating shafts through the midpoint of the weights (or some other selected reference point on the shaft) and a data plane, e.g., a horizontal plane passing through the respective shafts. At the same point in time, the weights 20a will have an angle B similarly measured. The centrifugal force generated by each of the rotating weights will be outwardly directed along the respective radial lines. The direction and magnitude of the movement imparted to the conveyor at a point in time is determined primarily by the resultant of the centrifugal forces of the rotating weights which in turn depends upon the relative position of the rotating eccentric weights with respect to each other. For example, if at a first point in time, angles A and B both have the same value, e.g., 135° in quadrant II, the magnitude of the resultant force would be at a maximum in that direction Upon rotation of 90°, angle A is now 225° while angle B is 45°, thus the forces are pointing in the opposite directions and the resultant force is a minimum. With an additional rotation of 90°, the forces are again pointing in the same direction, 315°, in quadrant IV so that the resultant force is at a maximum. A further rotation of 90° causes the resultant force to again reach a minimum. From this it can be seen that the resultant force goes to a maximum and minimum twice in any 360° rotation of the shafts. By varying the relative positioning or relative phase angle between the shafts, the direction or angle of attack of the resultant forces can be changed so that the conveying rate (and even the direction of movement) of the material on the trough can be changed.

A control system for the relative phase angle of the shafts with respect to one another in accordance with the present invention is generally illustrated in FIG. 1 where it may be seen that sensors or proximity switches 42 and 44 are located adjacent shafts 20 and 22 for sensing the position of its associated rotating shaft. Such proximity switches are well known in the prior art and are readily available from Fenner Industrial Controls located in Maple Grove, Minnesota. Such proximity switches sense the shafts in a particular position, called a flag position, denoted by character numeral 23. The position information gathered by switches 42 and 44 is continuously provided by signals to a controller 46 which in response to the time sequence or value thereof generates a real phase angle signal corresponding to the phase angle difference of the shafts. Controller 46 then compares the value of the real phase angle signal to a predetermined phase angle signal representing either the desired direction of the resultant force or the peak displacement to be imparted to the conveyor trough. Such values corresponding to the actual direction or displacement have been previously determined and then programmed into the controller from the user input station 47. The controller 46 then causes the variable frequency drive 48 to continuously adjust the speed of motor 36 (and its associated shaft) until the real phase angle signal approximates the programmed value. Thereafter the speeds of the motors are maintained essentially the same. This temporary adjustment of the rotational speed provides the vibratory conveyor system the capability of imparting a maximum force in a desired direction to the vibratory trough.

Figure 5:
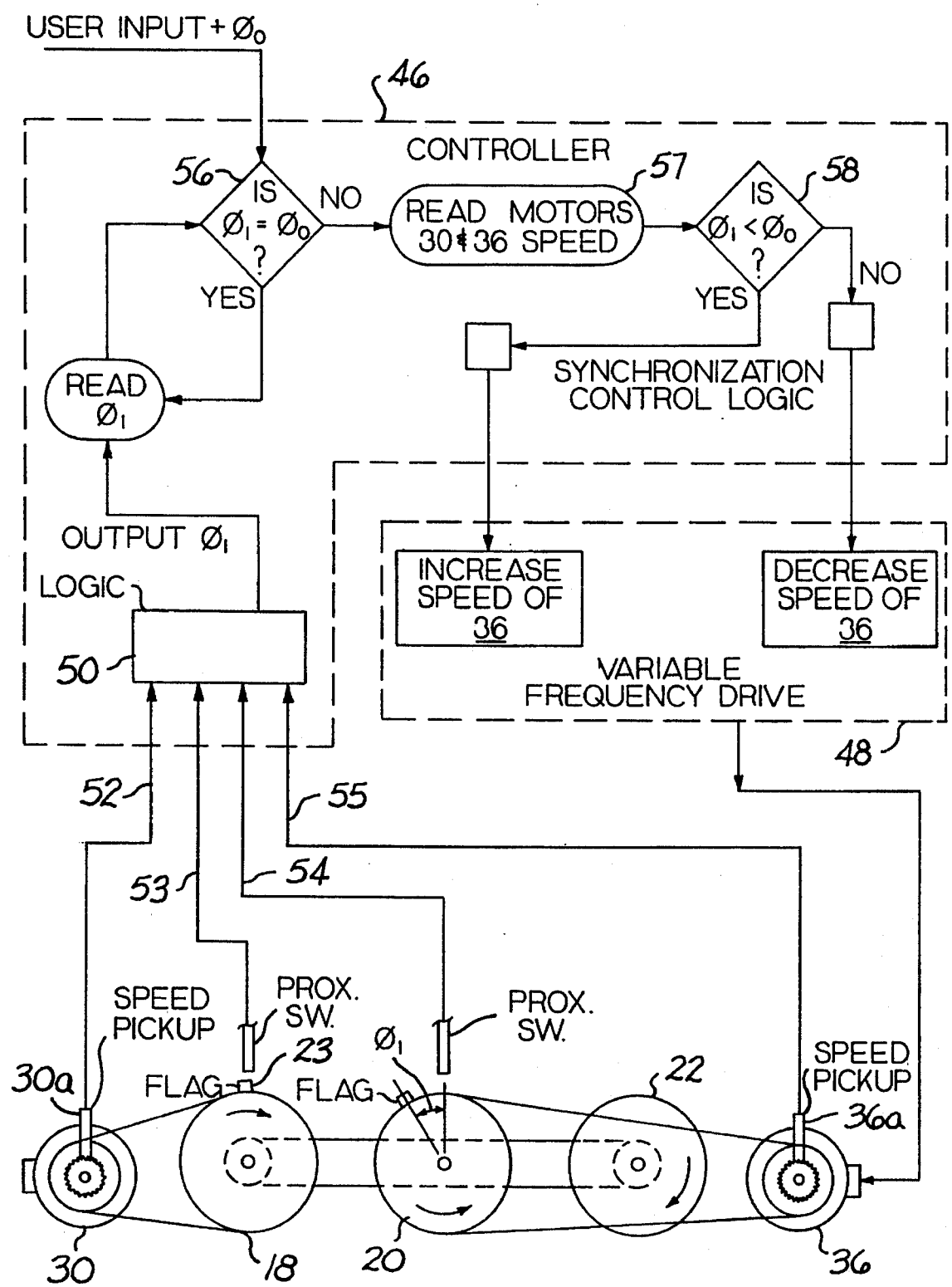
FIG. 5 is a schematic and flow diagram of the apparatus of FIG. 1 depicting the various routines used in comparing the speed of rotation of the shafts and controlling the speed of the motors driving the shafts.

FIG. 5 provides a blended schematic and flow chart that demonstrates the operation of the control system in accordance with the present invention. The controller is denoted by the dashed lines with character numeral 46, while the variable frequency drive is denoted by the dashed rectangle 48. A controller of the type used in the present invention, known as a M-Track Digital Synchronization Control, may be obtained from the Ohio Transmission and Pump Company located in Louisville, Ky. The variable frequency drive may also be obtained from the Ohio Transmission and Pump Company under the tradename VLT series 3000.

Controller 46 receives a multiple of signal inputs 52, 53, 54 and 55 directed toward the logic 50. Input signal 52 represents a value for the motor speed of motor 30 detected by speed pickup 30a while input 55 is a signal representing the value for the motor speed of motor 36 from pickup 36a. Inputs 53 and 54 are the respective signals representing the respective positions of flag data point 23 on shafts 18 and 20. The output $\phi_1$ of logic 50 is a value representing the real time phase angle difference between shaft 20 and shafts 18, 22, which, as stated above, is a measure of the magnitude and direction of the resulting force. Another input into controller 46 is a value $\phi_0$ that represents the desired magnitude and direction of the resulting force received from the user input station 47. The values $\phi_1$ and $\phi_0$ are continuously compared at comparison routine 56. A continuous loop occurs as long as the values are the same, i.e., a YES determination of comparison routine 56. If the values are not the same, i.e., a NO determination, then the speed of motor 36 is adjusted. This is accomplished by first reading the speed of motors 30 and 36 at READ 57, allowing the determination of the relationship between the values $\phi_1$ and $\phi_0$ at comparison routine 58. In the case of $\phi_1$ being less than $\phi_0$ or a YES determination, then variable frequency drive 48 is caused to temporarily increase the speed of motor 36 (and its associated shaft) until the values are approximately the same. In the case of $\phi_1$ being more than $\phi_0$ or a NO determination, then variable frequency drive 48 is caused to temporarily decrease the speed of motor 36 until the values are approximately the same.

Figure 6:
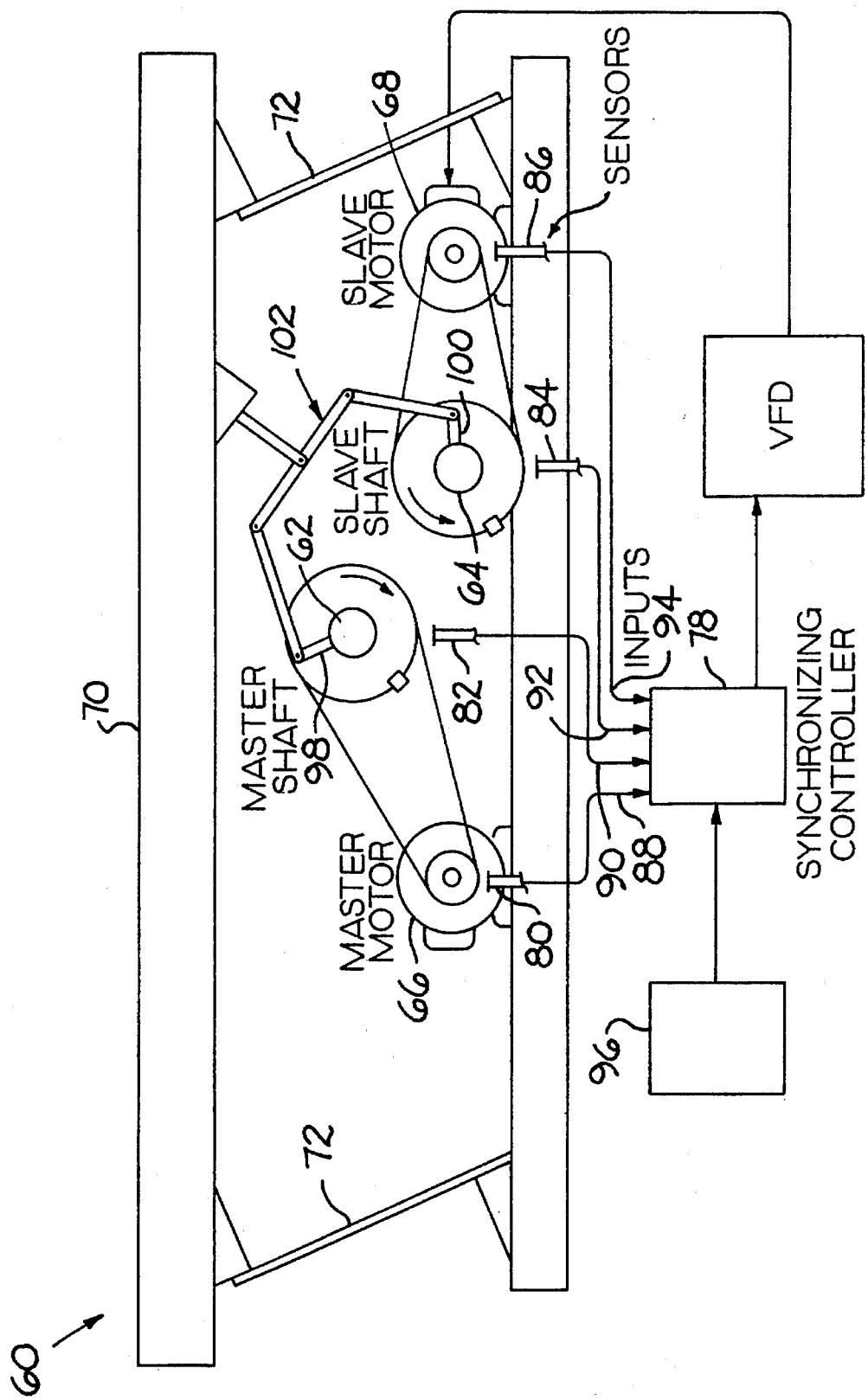
FIG. 6 is another embodiment of the present invention in which the vibratory motion of the conveyor trough is imparted by a plurality of crank shafts mounted on rotating shafts.

The eccentric crank shaft vibratory conveyor system 60 illustrated in FIG. 6 depicts a pair of rotating shafts 62 and 64 respectively driven by motors 66 and 68, all mounted beneath a conveyor trough 70. Springs 72, attached at one end to trough 70 and at the other end to a base 74, are tuned as appropriate. Proximity switches 80, 82, 84 and 86 measure values for motor speeds and shaft positions, and provide inputs 88, 90, 92 and 94 to controller 78 along with the predetermined value for trough displacement from user input station 96. Shafts 62 and 64 are each provided with crankshaft arms 98 and 100 that are operatively interlinked and pivotally connected to trough 70 by a plurality of linked arms 102. Shafts 62 and 64 may be rotated in opposite directions or in the same direction, as desired. Through the connection with crank arms 98, 100 and linked arms 102 to trough 70, shafts 62 and 64 impart a predetermined displacement or amplitude to trough 70 and it contents.

The theory of operation of the two shaft eccentric crankshaft device is set forth in U.S. Pat. No. 5,404,996, which is incorporated by way of reference for its thorough discussion of the subject. Briefly, however, the location of crank arms with respect to each other, i.e., the relative phase angle, determines the periodic maximum and minimum amplitude supplied to trough 70. When the relative phase angle is changed, the maximum amplitude imparted to the trough is changed. As described with respect to the embodiment of FIG. 6, the sensor switches 82 and 84 proximate shafts 62 and 64 provide information as to the relative location of the crankshafts, i.e., the relative phase angle, to controller 78.

The real time value of the relative phase angle determined by controller 78 is first compared to the predetermined phase angle input from the user input station 96. The predetermined phase angle input corresponds to a desired amplitude being supplied to trough 70. The speed of motor 68 is altered to vary the rotational speed of shaft 64 so that the real time value of the phase angle approaches the value of the predetermined phase angle value. Once the value of the predetermined phase angle is reached, the speed of motor 68 becomes essentially the same speed as motor 66, maintaining the proper relative phase angle relationship.

It is understood that, in light of a reading of the foregoing description and drawings, those with ordinary skill in the art will be able to make changes and modifications to the present invention without departing from the spirit or scope of the invention, as defined in the following appended claims.

I claim:

1. A vibratory control system for adjustably controlling a resultant force supplied to a conveyor trough by changing a phase angle relationship between eccentric weights mounted on rotating shafts comprising (a) a base connected by a plurality of spring members to a conveyor trough;

(b) a frame connected to said conveyor trough;

(c) three shafts each coupled to and rotating respective associated eccentric weights, a first shaft of said three shafts being driven by a first motor and driving a second shaft at the same revolutions per minute, and a third shaft being driven independently of said first shaft by a second motor;

(d) a speed control device continuously adjusting the speed of one of said first and second motors and the revolutions per minute of said shafts driven by said one motor so as to maintain the real phase angle at approximately the same value as the predetermined phase angle, said first and third shafts and associated eccentric weights being constantly in phase with each other, and the angle difference between said first and third shafts and associated eccentric weights and said second shaft and associated eccentric weight determining said relative phase angle, said associated weights collectively imparting a resultant vibratory force to said conveyor trough;

(e) a pair of phase angle sensing devices each associated with said first and third shafts and associated eccentric weights for generating a signal indicative of the position of the associated eccentric weight;

(f) a control device responsive to the signals received from said phase angle sensing devices for
      measuring a real time phase angle between said eccentric weights and comparing the real phase angle value and a value of a predetermined phase angle and generating a phase angle signal proportional to a difference between said real and predetermined phase angles; and (g) a motor speed control device responsive to said phase angle signal for adjusting the speed of one of said motors until said real phase angle has about the same value as said predetermined phase angle.

2. The system of claim 1 in which said first and third shafts and associated eccentric weights are constantly in phase with each other, and the angle difference between said first and third shafts and associated eccentric weights and said second shaft and associated eccentric weight determines said relative phase angle.

3. The system of claim 2 in which a change of phase angle relationship between said phase elements results in a change in the direction of the resultant force applied to said trough.

4. A vibrating conveying system for changing or maintaining a resultant vibratory force supplied to a conveyor trough comprising
   (a) a support base,
   (b) a conveyor trough connected to said support base through vibratory elements,
   (c) a first drive assembly including a first rotatable shaft, a first phase element connected to said first shaft, and a motor for rotating said first shaft,
   (d) a second drive assembly including a second rotatable shaft, a second phase element connected to said second shaft, and a second motor for rotating said second shaft, said first and second shafts providing a resultant vibratory force to said trough determined by a relative phase angle relationship between said first and second phase elements, said first and second phase elements being crankshafts mounted on said first and second rotating shafts, said first and second crankshafts pivotally connected by a plurality of linkage arms to said trough and imparting a vibratory motion to said trough;
   (e) detection sensor means associated with each of said first and second shafts for generating first and second signals when locating reference points on said first and second shafts,
   (f) user input means for generating a predetermined phase angle signal representing a value of a phase angle relationship between said first and second phase elements required to provide a predetermined resultant vibratory displacement to said trough,
   (g) a controller including
      means in response to said first and second signals for generating a detected phase angle signal corresponding to real time phase angle existing between said first and second shafts,
      comparison means for comparing said detected phase angle signal and said predetermined phase angle signal and generating a motor speed control signal proportional to the difference between said predetermined phase angle signal and said detected phase angle signal, and
      motor speed control means responsive to said motor speed control signal, for altering the speed of at least one of said first and second motors until said detected phase angle and said predetermined phase angle signals are approximately the same value, said change of relative phase angle relationship between said phase elements results in a change in the magnitude of the resultant force applied to said trough and thereby providing a resultant vibratory force to said trough substantially the same as the predetermined resultant vibratory force.

5. A vibrating conveying system for generating a sinusoidal vibratory motion in which a resultant vibratory force supplied to said conveyor trough is at a predetermined angle of attack to said conveyor trough resulting in nonparallel vibratory displacements of said conveyor trough with respect to a direction of conveyance, said system maintaining or changing said resultant vibratory force during operation thereof and comprising
   (a) a support base,
   (b) a conveyor trough connected to said support base through vibratory elements,
   (c) a first vibratory drive assembly including a first rotatable shaft, a first phase element connected to said first shaft, and a first motor for rotating said first shaft,
   (d) a second vibratory drive assembly having a single second rotatable shaft connected to a second phase element, and a second motor for rotating said second shaft, said first and second vibratory drive assemblies collectively providing a resultant vibratory force with said nonparallel displacements to said trough as determined by a relative phase angle relationship between said first and second phase elements,
   (e) detection sensor means associated with each of said first and second shafts for generating first and second signals when locating reference points on said first and second shafts,
   (f) user input means for generating a predetermined phase angle signal representing a value of a phase angle relationship between said first and second phase elements required to provide said predetermined resultant vibratory force to said trough,
   (g) a controller including
      means in response to said first and second signals for generating a detected phase angle signal corresponding to real time phase angle existing between said first and second shafts,
      comparison means for comparing said detected phase angle signal and said predetermined phase angle signal and generating a motor speed control signal proportional to the difference between said predetermined phase angle signal and said detected phase angle signal, and
      motor speed control means responsive to said motor speed control signal, for altering the speed of at least one of said first and second motors until said detected phase angle and said predetermined phase angle signals are approximately the same value, thereby providing a resultant vibratory force to said trough substantially the same as the predetermined resultant vibratory force.

6. The system of claim 5 in which said first vibratory drive element includes a pair of shafts each having associated phase elements, said pair of shafts being rotably connected by a belt so that each of said pair of shafts rotates at the same revolutions per minute.

7. The system of claim 6 in which said phase element being eccentric weights associated with each of said shaft, one of said pairs of rotating shafts having respective associated eccentric weight constantly in phase with respective associated eccentric weight of said single rotating shaft.

8. The system of claim 5 in which said first and second phase elements are crankshafts mounted on said first and second rotating shafts, said first and second crankshafts pivotally connected by a plurality of linkage arms to said trough and imparting a vibratory motion to said trough and a resultant force having a fixed direction.

* * * * *